April 17, 1945.　　　F. TURRETTINI　　　2,373,928
EPISCOPIC ILLUMINATING DEVICE
Filed Oct. 27, 1942　　　3 Sheets-Sheet 1

INVENTOR
Fernand Turrettini,
BY
Wallhauster & Groff
ATTORNEYS.

April 17, 1945.   F. TURRETTINI   2,373,928

EPISCOPIC ILLUMINATING DEVICE

Filed Oct. 27, 1942   3 Sheets-Sheet 2

INVENTOR
Fernand Turrettini,
BY
ATTORNEYS.

April 17, 1945.  F. TURRETTINI  2,373,928
EPISCOPIC ILLUMINATING DEVICE
Filed Oct. 27, 1942  3 Sheets-Sheet 3
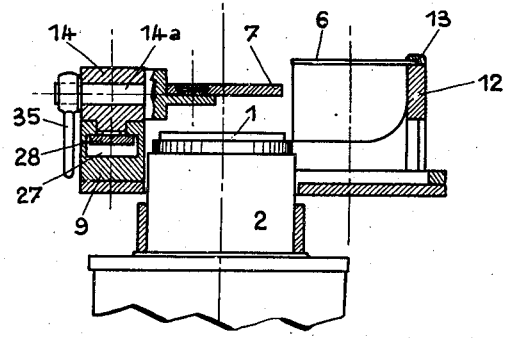
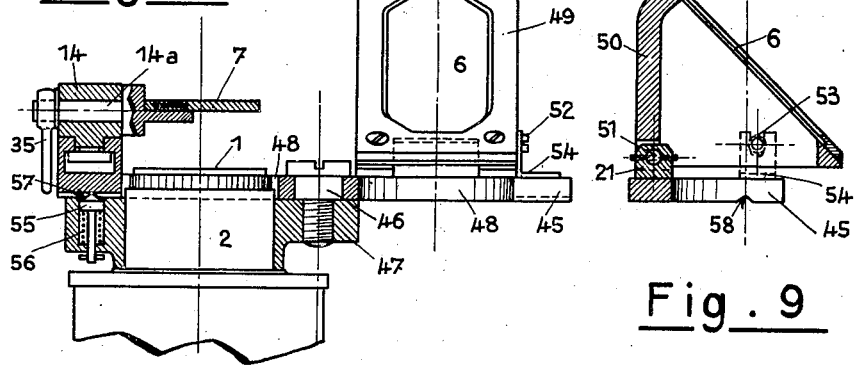
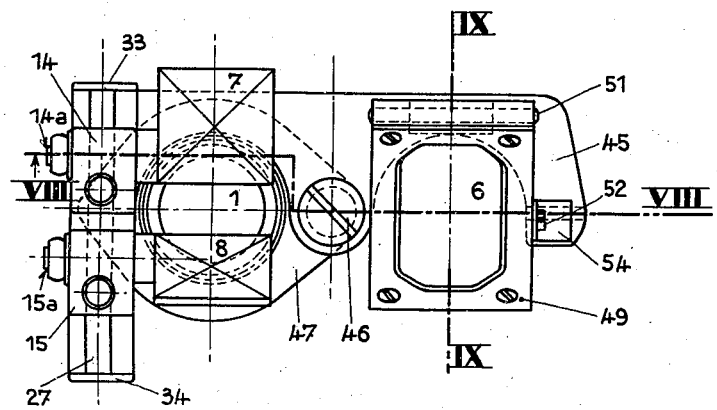
INVENTOR
Fernand Turrettini,
BY
ATTORNEYS.

Patented Apr. 17, 1945

2,373,928

UNITED STATES PATENT OFFICE 2,373,928

EPISCOPIC ILLUMINATING DEVICE

Fernand Turrettini, Bellevue-Geneva, Switzerland

Application October 27, 1942, Serial No. 463,532
In Switzerland January 28, 1942

9 Claims. (Cl. 88—24)

The conditions of illumination under which the surface of an opaque object is to be examined by means of an optical apparatus varies according to the purpose for which this examination is to be made. When it is desired to measure exactly the distance between various points of this surface the latter should be illuminated by a parallel beam of perpendicular incidence so as to obviate that the sharpness of the focussing has too great an influence on the appearance and the apparent dimensions of the observed image.

It is a known phenomenon that the image produced by oblique illumination of a surface changes in size for a very slight difference in focussing, i. e. a slight change in the distance between the surface under examination and the objective of the optical apparatus.

It is therefore necessary to make measurements with optical apparatus illuminated by a parallel beam of light which, after having impinged perpendicularly on the surface to be observed, enters the objective so as to fill it completely with light so as not to create dissymmetry in its separating power.

For this purpose there is often employed a transparent or semi-transparent blade which is interposed between the objective and the surface to be examined. This blade reflects, perpendicularly to the surface, a beam from the source of light which then enters the objective.

On the contrary, when it is desired to observe the details of the structure of a surface, without paying particular attention to accuracy in size, parallel rays of light directed perpendicular to the surface, is not suitable as they produce very little relief or contrast in the appearance of the image.

A more or less oblique illumination is therefore more suitable to let appear more clearly the details of the surface. It thus follows that the illuminating device should be changed to pass from one condition of use to another.

The subject of the present invention is an episcopic illuminating device which permits, by a simple operation, of passing from illumination with perpendicular light to illumination with oblique light. It is characterized in that a movable support carrying two illuminating devices, one for operation with perpendicular light and the other for operation with oblique light, means being provided for bringing one or other of these illuminating devices into the operative position above the objective.

Two forms of construction of the device forming the subject of the present invention are shown by way of example and diagrammatically in the accompanying drawings, wherein:

Fig. 6 is a section on the line 6—6 of Fig. 5.

Fig. 7 is a plan of a second form of construction.

Fig. 8 is a partial section on the line 8—8 of Fig. 7 and

Fig. 9 is a section on the line 9—9 of Fig. 7.

Figure 1:
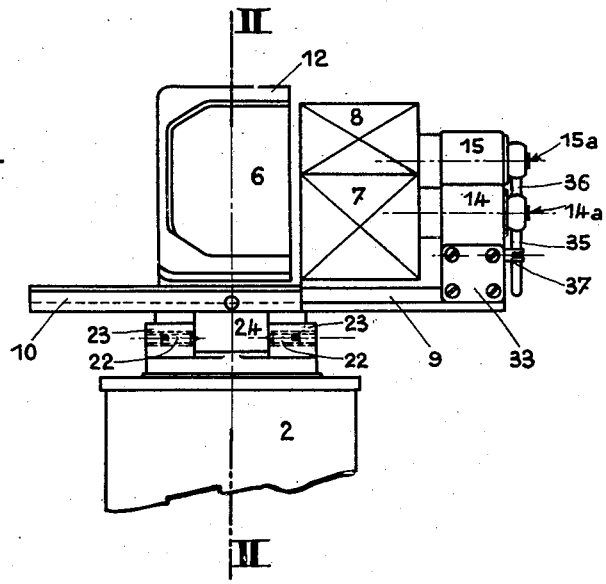
Fig. 1 is a side view of a first form of construction.
Figure 2:
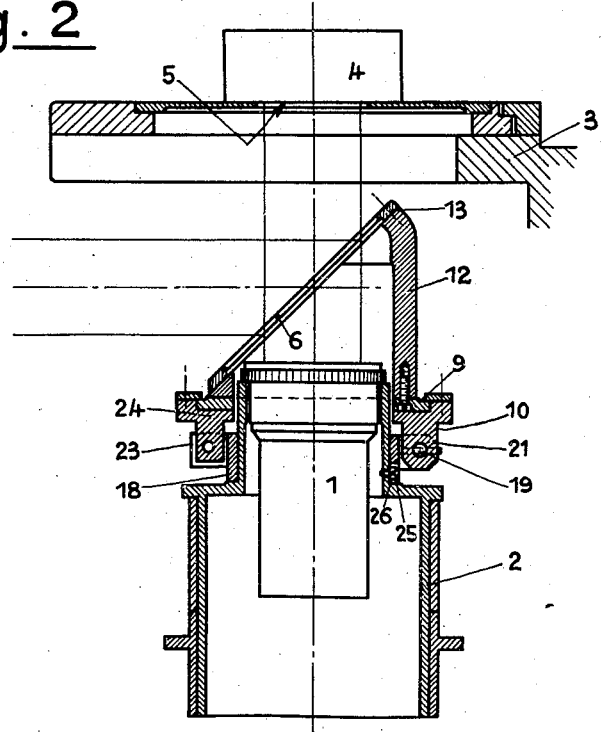
Fig. 2 is a section on the line 2—2 of Fig. 1.
Figure 3:
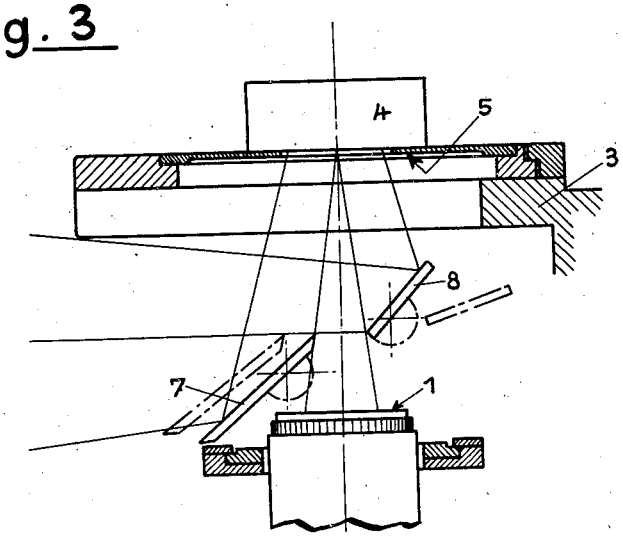
Fig. 3 is a diagrammatic view showing the operation when working with an inclined light.
Figure 4:
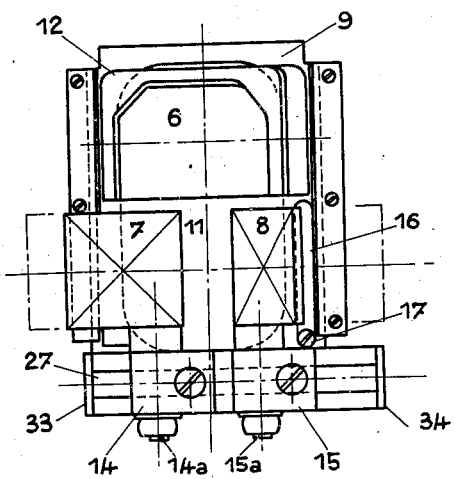
Fig. 4 is a top plan.
Figure 5:
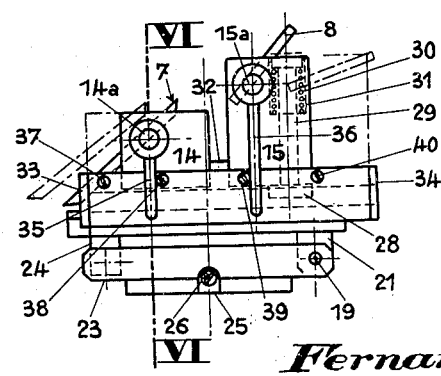
Fig. 5 is an end view.

The projection apparatus suited to receive the illuminating device claimed in the present invention, is provided with the used factures of already known apparatus: an objective 1 secured in a tube 2; an object table 3 suitable for receiving the object 4 of which the lower surface 5 is to be examined; a source of light (not shown) located in such a manner as to emit a beam of rays approximately perpendicular to the optical axis of the objective 1. For examination by perpendicular illumination a beam of parallel rays (Fig. 2) and a first light transmitting or illuminating device formed by a semi-transparent blade 6 are used. For examination by oblique illumination (Fig. 3) a second light transmitting or illuminating device formed by two adjustable mirrors 7, 8 located on both sides of the optical axis, are used.

In the form of construction shown in Figs. 1 to 6. these two illuminating or light transmitting devices are supported by the same sliding member 9, sliding in a guide 10, which is provided for both with a central opening 11 through which the objective 1 passes. The guide 10 is itself carried by a collar 18 which is to be secured on the tube 2.

The semi-transparent blade 6 is held on a support 12 by means of a frame 13. This support 12 is secured to one of the ends of the sliding member 9.

The adjustable mirrors 7, 8 are rotated at 14a and 15a in brackets 14 and 15 mounted on the other end of the sliding member 9.

It will be seen that for passing from an observation with oblique illumination to an observation with perpendicular illumination and vice versa, no dismantling of the illuminating device, secured to the tube 2, is necessary but that it is sufficient to bring above the objective one or other of the illuminating devices by shifting of the sliding member 9.

In order to enable one or other of the illuminating or light transmitting devices to be brought into position more quickly, means are provided for limiting the stroke of the sliding member 9 and for defining its operative positions. These means are formed by a groove 16 provided in the sliding member 9 which at one or other of its ends abuts against a stop 17 secured to the guide 10. The latter is connected to the collar 18 by a hinge. This hinge is provided with a hinge pin 19 perpendicular to the optical axis and passes through lugs (not shown) secured to the collar, and a lug 21 secured to the guide 10. This hinge enables the semi-transparent blade 6 to be placed at the exact angle necessary for obtaining an illumination perpendicular to the surface 5. Fastening screws 22, provided in the parts 23 of the collar 18, bear on opposite sides of a projecting member 24 provided underneath the guide 10 so as to enable the blade 6 to be secured in its angular position.

The angular position of the collar 18 on the tube 2 is determined by a pin 26 engaging with a notch 25 provided in the collar 18. This pin and this notch are provided in such a manner that the blade 6 is perpendicular to the axis of the beam of rays emitted by the source and at the optical axis.

As the examination of a surface by oblique illumination should be effected either with bright or dark ground of the field, the brackets 14 and 15 are movable on the sliding member 9 perpendicularly to the direction of movement of the latter. For this purpose a T-groove 27, Fig. 6, is provided in the sliding member 9 and the brackets 14 and 15 are guided in this T-groove by means of a bolt head 28 of a rod 29 urged upwardly by a coiled spring 30 located in a recess 31 provided in each of the brackets 14 and 15. The movement of the latter towards one another is limited by an abutment piece 32 secured to the sliding member 9 and in the opposite direction by stops 33 and 34 secured to the ends of the T-groove. The pivots 14a and 15a are provided with arms 35 and 36 of which the angular movements are limited by stops 37, 38, 39, and 40 secured to the sliding member 9. This arrangement enables the positions of the mirrors, suitable for oblique illumination with bright ground of field to be found rapidly, for which purpose the brackets 14 and 15 are moved towards one another and both come into engagement with the abutment piece 32, whilst the arm 36 is brought into contact with the stop 39 and the arm 35 into contact with the stop 38.

When it is desired to pass to oblique illumination with dark ground of field the brackets 14 and 15 are moved away from one another and brought against the stops 33 and 34, whilst the arm 35 is brought against the stop 37 and the arm 36 against the stop 40.

It will thus be seen that this form of construction allows of passing from perpendicular illumination to oblique illumination by sliding the sliding member 9 and from inclined illumination with a clear ground of field to illumination with a dark ground of field, or vice versa, by moving the brackets 14 and 15 carrying the mirrors 7 and 8 away or towards one another and bringing the arms secured to the pivots of the mirrors against their respective stops.

Figs. 7, 8 and 9 show another form of construction in which the change of the illumination is effected by rotation of a support formed by a plate 45 pivoted on a shaft 46 parallel to the optical axis. This shaft is secured to a collar 47 mounted on the tube 2 carrying the objective. On each side of this shaft 46, the plate 45 has recesses 48 adapted to enable the plate to be turned through 180° in spite of the projection formed by the objective 1.

The illuminating devices for observation with perpendicular or oblique illumination are located on both sides of the shaft 46.

The semi-transparent blade 6 is secured by a frame 49 to a support 50 hinged to the plate 45 at 51. It may be fixed in position by means of a screw 52 engaging with a notch 53 provided in an angle bracket 54 secured to the plate 45.

The mirrors 7 and 8 are pivoted in brackets 14 and 15 similar to those in the first form of construction and also guided in a T-groove 27 provided in the plate 45. The devices provided for adjusting the position of the mirrors, either for oblique illumination with a clear ground of field or for oblique illumination with a dark ground of field, are identical with those in the first form of construction.

In order to define the two operative positions of the plate 45 and for maintaining it in these positions, a plunger 55 pushed upwardly by a coiled spring 56 mounted in the collar 47, engages with its point in notches 57 and 58 provided in the lower face of the plate 45.

The operation of the assembly of this second form of construction is identical with that of the first form of construction, with the sole difference that the change of the illuminating devices is effected by rotation instead of being effected by sliding.

Two forms of construction have been described by way of example but it will be understood that modifications may be made, particularly in the form and arrangement of the guides for guiding the brackets carrying the mirrors and those of the sliding member 9.

I claim:

1. In an episcopic illuminating device including an objective and a single source of light, and relatively fixed tubular objective support, the combination comprising first and second light transmitting devices respectively serving for operation with perpendicular illumination and for operation with oblique illumination, and a movable support carrying said illuminating devices in spaced relation, said movable support being shiftably connected to the objective support and movable transversely of the optical axis of said objective whereby an operator may selectively bring one or other of said illuminating devices into operative position above said objective.

2. An episcopic illuminating device according to claim 1, including a collar on said objective support, said movable support being mounted on said collar, means for determining the position of said collar relative to said objective support, and means for securing said movable support in selected operative positions.

3. An episcopic illuminating device according to claim 1, including a collar mounted on said objective support, a shaft mounted in said collar, said shaft being parallel to the optical axis of said objective, said movable support being pivotally connected to said collar by said shaft.

4. An episcopic illuminating device according to claim 1, including a collar on said objective support, means for slidably mounting said movable support on said collar in a plane perpendicular to the axis of said objective, means for determining the position of said collar relative to said objective support, and means for securing said movable support in its various operative positions.

5. An episcopic illuminating device according to claim 1, including a collar on said objective support, said movable support being mounted on said collar, means for determining the position of said collar relatively to said objective support, means for securing said movable support in its various operative positions, and means for adjusting and fixing the inclination of the light transmitting device for operation with perpendicular illumination.

6. An episcopic illuminating device according to claim 1 including a collar on said objective support, said movable support being mounted on said collar, means for determining the position of said collar relatively to said objective support, means for securing said movable support in its various operative positions, and means for adjusting and fixing the inclination of the first light transmitting device for operation with perpendicular illumination, said illuminating device including a semi-transparent blade located obliquely relatively to the optical axis of said objective, and said second light transmitting device for operation with oblique illumination including two adjustable mirrors, said mirrors when in the operative position being located on opposite sides of the optical axis of said objective.

7. An episcopic illuminating device according to claim 1, including a collar on said objective support, said movable support being mounted on said collar, means for determining the position of said collar relative to said objective support, means for securing said movable support in its various operative positions, and means for adjusting and fixing the inclination of the first illuminating device for operation with perpendicular illumination, said illuminating device including a semi-transparent blade located obliquely relative to the optical axis of said objective; said second illuminating device for operation with oblique illumination including, two adjustable mirrors, said mirrors when in the operative position being located on opposite sides of the optical axis of said objective, a pair of members slidably mounted on said movable support, said mirrors being pivotally mounted one in each of members, a plurality of stops in said movable member, some of said stops serving to determine the spacing of said members for operation with a bright ground of the field, while others of said stops serve to determine the spacing of said members for operation with a dark ground of the field.

8. An episcopic illuminating device according to claim 1, including a collar on said objective support, said movable support being mounted on said collar, means for determining the position of said collar relative to said objective support, means for securing said movable support in its various operative positions, and means for adjusting and fixing the inclination of the first illuminating device for operation with perpendicular illumination, said illuminating device including a semi-transparent blade located obliquely relatively to the optical axis of said objective, said second illuminating device for operation with oblique illumination including two adjustable mirrors, said mirrors when in the operative position being located on opposite sides of the optical axis of said objective, and means for defining the angular position of said mirrors relative to the optical axis of said objective, the mirrors in one position serving for operation with a bright ground of the field and in another position serving for operation with a dark ground of the field.

9. An episcopic illuminating device according to claim 1, including a collar on said objective support, said movable support being mounted on said collar, means for determining the position of said collar relatively to said objective support, means for securing said movable support in its various operative positions, means for adjusting and fixing the inclination of the first illuminating device for operation with perpendicular illumination, said illuminating device including a semi-transparent blade located obliquely relatively to the optical axis of said objective, said second illuminating device for operation with oblique illumination including two adjustable mirrors, said mirrors when in the operative position being located on opposite sides of the optical axis of said objective, and means for defining the angular position of said mirrors relatively to the optical axis of said objective, the mirrors in one position serving for operation with a bright ground of the field and in another position serving for operation with a dark ground of the field, said means for adjusting the angular position of said mirrors including a plurality of stops on said movable support, and two arms, one arm on each pivot of said mirrors, said arms co-operating with said stops.

FERNAND TURRETTINI.